Jan. 28, 1936.                F. LINDER                2,029,244
                          DRIVING MECHANISM
                         Filed Nov. 26, 1932
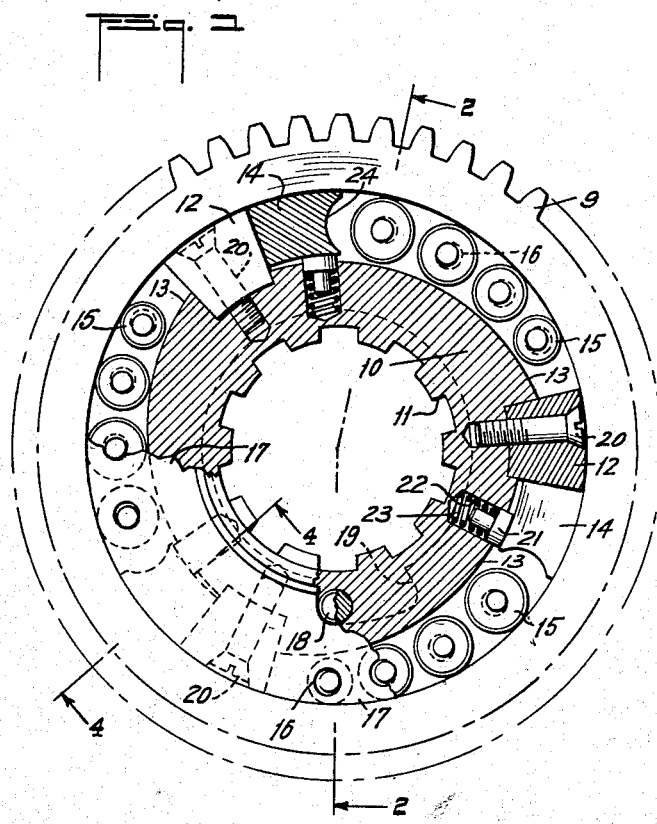
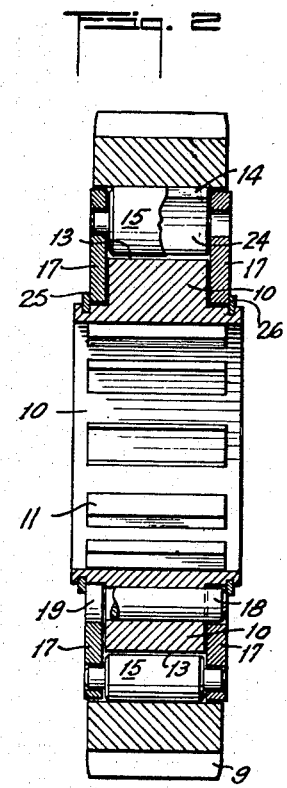
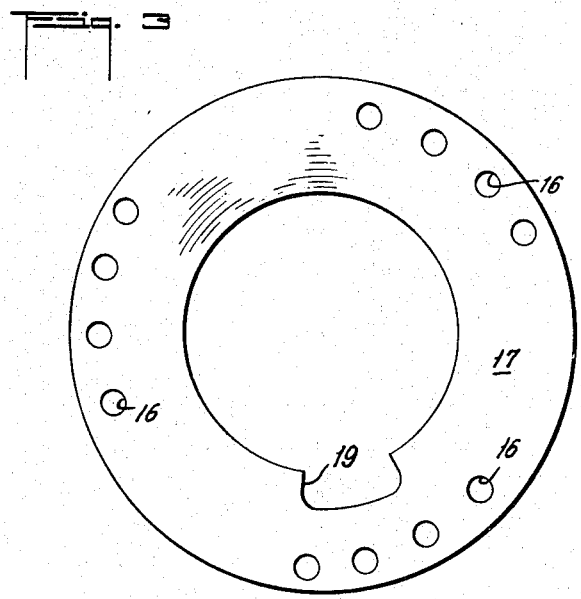
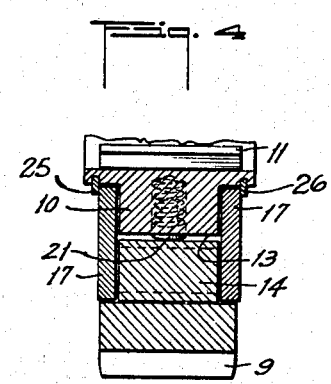
INVENTOR.
Francis Linder
BY
ATTORNEY.

Patented Jan. 28, 1936

2,029,244

UNITED STATES PATENT OFFICE 2,029,244

DRIVING MECHANISM

Francis Linder, East Orange, N. J., assignor, by mesne assignments, to Eclipse Aviation Corporation, East Orange, N. J., a corporation of New Jersey Application November 26, 1932, Serial No. 644,497

11 Claims. (Cl. 192—45)

This invention relates to clutches of the class frequently called "overrunning clutches" which provide an automatically releasable driving connection between relatively revoluble members.

One of the objects of the invention is to provide releasable connection between the driving and driven members through the agency of rollers, while avoiding or preventing frictional or sliding engagement of the rollers with each other or with the other elements of the structure, such as frequently occurs in devices of this class, and tends to cause wear and "flat" areas on the rollers.

In this connection a feature of the invention is the provision of novel mounting means for the torque transmitting rollers, said novel mounting means being preferably in the form of a cage in which the rollers are journalled for limited angular movement as well as free rotation about their individual axes, whereby the rollers can more readily roll freely along the surface of the outer race of the clutch when not transmitting torque.

Another object of the invention is to provide a novel clutch of the foregoing character in which the torque transmitting rollers, when no torque is being transmitted, (that is, when free wheeling or overrunning is occurring) are completely out of contact with the inner race of the clutch.

These and other objects of the invention will become apparent upon consideration of the following specification, when read with reference to the accompanying drawing, wherein is illustrated the preferred embodiment of the invention. It is to be expressly understood, however, that the drawing is for the purpose of illustration only, and is not designed as a definition of the limits of the invention, reference being had for this purpose to the appended claims.

In the drawing,

Fig. 1 is a transverse sectional view of a clutch construction embodying the invention in one form;

Fig. 2 is a longitudinal sectional view along the line 2—2 of Fig. 1;

Fig. 3 is a view in elevation of one of the roller cages; and

Fig. 4 is a fragmentary sectional view taken along the line 4—4 of Fig. 1.

In the following description and in the claims, it is assumed for purposes of illustration that the direction of torque transmission will be from the outer race of the clutch to the inner race, and that the outer race accordingly constitutes the driving member, and the inner race the driven member; but it is to be understood that if the direction of torque transmission is reversed, the following description and claims will nevertheless be applicable to such a reversed arrangement if the word "driven" is read "driving" and the word "driving" is read "driven".

With the foregoing in mind, and referring first to Fig. 1, the driving member is shown in the form of a gear 9 adapted to receive energy from a prime mover, such as the crankshaft of an internal combustion engine, while the driven member 10 is shown as of annular form, with its inner surface splined as indicated at 11 for engagement with corresponding splines on the shaft to be driven, as for example, the propeller shaft of a motor vehicle, or an extension of the armature shaft of a generator. As shown, all points on the inner surface of the driving gear 9 are equidistant from the common axis about which the elements 9 and 10 both rotate, while the outer surface of the element 10 is irregular and includes a plurality of cam surfaces 13, the curvature of which is such as to produce a number of tapering pockets between the elements 9 and 10, the successive pockets being separated by the interposition of the controlling stops 12 and pilot members 14 to be further described.

The rollers 15 of the clutch are preferably graduated in size, with each roller machined down to a small diameter at either end so as to be received in drilled holes 16 of somewhat larger diameter, said holes being provided at properly spaced positions adjacent the outer surface of a pair of annular plates 17 held against axial displacement by retaining rings 25 and 26 located in grooves cut circumferentially near the left and right hand ends respectively of the driven member 10 as viewed in Figs. 2 and 4. These plates 17 constitute a cage within which the rollers 15 may adjust themselves to variable bearing points by reason of the larger diameter of the holes 16. These bearing areas thus facilitate free rotation of the rollers when not transmitting torque between the elements 9 and 10.

It will be seen that in the relative positioning of the parts as shown in Fig. 1, the rollers are out of contact with the cam surfaces 13 of the inner race 10 of the clutch, and this represents the condition when the driven shaft is overrunning, and no torque is being transmitted. During such periods, the rollers 15 roll freely along the inner surface of the gear 9 and have a limited gyratory, as well as a free rotary movement about the surfaces of the holes 16 in the cage 17.

In order to maintain this condition of free rolling action, means are provided for holding the cage 17 in the relative position indicated in Fig. 1 during the overrunning (free wheeling) period, and such means further acts to shift said cage 17 through a sufficient arc relatively to the driven member 10 to carry all the rollers 15 into position to transmit torque as soon as the rotation of the driven shaft is retarded, or that of the driving gear 9 accelerated. As shown, such means includes a transversely disposed pin 18 extending through the inner race 10 and projecting therefrom as indicated in Fig. 2, into engagement with a cut-out portion 19 of the plates 17, the pin being maintained against the left hand edge of said cut-out portion 19 (as indicated in Fig. 1) during the periods when the inner race 10 is running ahead of the driving member 9. The pin 18 therefore acts to impart rotation to the cage 17 and maintain said cage in fixed angular relation to the inner race 10, as well as to the stops 12 secured thereto by the provision of suitable fastening means 20. Also during this period the pilot members 14 which correspond in number to the number of stops 12, and cam surfaces 13, and have outer arcuate surfaces corresponding in contour to the curvature of the inner surface of the gear 9, are maintained in frictional contact therewith by suitable means which as shown takes the form of a corresponding number of plungers 21 received in radial bores 22 in the inner race, and each urged outwardly by a suitable spring 23. Each pilot member 14 is thus held by the pressure of the springs 23 in abutment with the corresponding stop 12 until termination of the overrunning action and the resumption of positive drive from the member 9. When this resumption of torque transmission occurs, the first torque impulse overcomes the pressure of the springs 23 and shifts the pilots 14 into contact with the associated roller 15, the forward edge of each pilot being grooved as indicated at 24 to provide smooth contact and prevent deformation of the cylindrical surfaces of the rollers. The thrust thus imparted to the rollers 15 is transferred therethrough to the cage 17 and all the rollers are moved into wedging relation with respect to both the cam surfaces 13 and the inner surface of the driving member 9, whereby a positive drive is established between the latter member and the inner race 10, it being understood that the cut-out portion 19 of the cage is of sufficient length to permit this forward shifting of the cage with respect to the inner race 10. This condition of the rollers continues until the occurrence of a tendency for the driven shaft to run ahead of the driving member 9 whereupon the cage 17 is again subjected to the roller releasing action of the pin 18 and the condition first described is again obtained.

There is thus provided a novel clutch of the overrunning type which embodies the features of advantage above pointed out and attains the objects of the invention as above set forth.

While it is apparent that the embodiment of the invention shown is of decided practical merit, it is to be understood that changes may be made in the form, details of construction and arrangement of the parts, while certain of the novel features may be employed to the exclusion of others, to the extent indicated by the varying scope of the appended claims. Reference is also to be made to my co-pending application No. 4,723, filed February 2, 1935, for generic claims covering the subject matter common to both disclosures.

What is claimed is:

1. An overrunning clutch comprising a driving member, a driven member, a roller cage interposed therebetween and concentric therewith, and capable of only limited angular play relative to said driven member, rollers journalled in said cage, and a radially movable pilot member frictionally engaging said driving member, and shiftable by virtue of said frictional engagement into contact with one of said rollers to advance said cage through a sufficient arc relatively to said driven member to carry all said rollers into position to transmit torque from said driving member to said driven member.

2. An overrunning clutch comprising a driving member, a driven member, a roller cage interposed therebetween and concentric therewith, and capable of only limited angular play relative to said driven member, rollers journalled in said cage, a radially movable pilot member frictionally engaging said driving member and shiftable by virtue of said frictional engagement into contact with one of said rollers to advance said cage through a sufficient arc relatively to said driven member to carry all said rollers into position to transmit torque from said driving member to said driven member, and means secured to said driven member to limit the play of said cage.

3. An overrunning clutch comprising a driving member, a driven member, a roller cage interposed therebetween and concentric therewith, and capable of only limited angular play relative to said driven member, rollers journalled in said cage, a radially movable pilot member frictionally engaging said driving member and shiftable by virtue of said frictional engagement into contact with one of said rollers to advance said cage through a sufficient arc relatively to said driven member to carry all said rollers into position to transmit torque from said driving member to said driven member, and means to limit the play of said pilot member, said limiting means comprising a stop engageable with said pilot member when the driven member overruns.

4. An overrunning clutch comprising a driving member, a driven member, a roller cage interposed therebetween and concentric therewith and capable of only limited angular play relative to said driven member, rollers journalled in said cage, and a pilot member frictionally engaging said driving member and shiftable by virtue of said frictional engagement into contact with one of said rollers to advance said cage through a sufficient arc relatively to said driven member to carry all said rollers into position to transmit torque from said driving member to said driven member, and means movable radially within said driven member to yieldably hold said pilot member in frictional engagement with said driving member.

5. An overrunning clutch comprising a driving member, a driven member, a roller cage interposed therebetween and concentric therewith and capable of only limited angular play relative to said driven member, rollers journalled in said cage, a pilot member frictionally engaging said driving member and shiftable by virtue of said frictional engagement into contact with one of said rollers to advance said cage through a sufficient arc relatively to said driven member to carry all said rollers into position to transmit torque from said driving member to said driven member, means secured to said driven member to limit the play of said cage, and means movable radially within said driven member to yieldably hold said pilot member in frictional engagement with said driving member.

6. An overrunning clutch comprising a driving member, a driven member, a roller cage interposed therebetween and concentric therewith and capable of only limited angular play relative to said driven member, rollers journalled in said cage, a pilot member frictionally engaging said driving member and shiftable by virtue of said frictional engagement into contact with one of said rollers to advance said cage through a sufficient arc relatively to said driven member to carry all said rollers into position to transmit torque from said driving member to said driven member, means secured to said driven member to limit the play of said pilot member, said limiting means comprising a stop engageable with said pilot member when the driven member overruns, and means movable radially within said driven member to yieldably hold said pilot member in frictional engagement with said driving member.

7. An overrunning clutch comprising a driving member, a driven member, a roller cage interposed therebetween and concentric therewith, and capable of only limited angular play relative to said driven member, rollers journalled in said cage, said rollers being capable of limited radial movement relative to said cage to thereby avoid friction with the driven member, a radially movable pilot member frictionally engaging said driving member and shiftable by virtue of said frictional engagement into contact with one of said rollers to advance said cage through a sufficient arc relatively to said driven member to carry all said rollers into position to transmit torque from said driving member to said driven member, and means secured to said driven member to limit the play of said cage.

8. An overrunning clutch comprising a driving member, a driven member, a roller cage interposed therebetween and concentric therewith, and capable of only limited angular play relative to said driven member, rollers journalled in said cage, said rollers being capable of limited radial movement relative to said cage to thereby avoid friction with the driven member, a radially movable pilot member frictionally engaging said driving member and shiftable by virtue of said frictional engagement into contact with one of said rollers to advance said cage through a sufficient arc relatively to said driven member to carry all said rollers into position to transmit torque from said driving member to said driven member, and means engageable with said pilot member to limit the angular play thereof.

9. An overrunning clutch comprising a driving member, a driven member, a roller cage interposed therebetween and concentric therewith and capable of only limited angular play relative to said driven member, rollers journalled in said cage, said rollers being capable of limited radial movement relative to said cage, to thereby avoid friction with the driven member, and a pilot member frictionally engaging said driving member and shiftable by virtue of said frictional engagement into contact with one of said rollers to advance said cage through a sufficient arc relatively to said driven member to carry all said rollers into position to transmit torque from said driving member to said driven member, and means movable radially within said driven member to yieldably hold said pilot member in frictional engagement with said driving member.

10. An overrunning clutch comprising a driving member, a driven member, a roller cage interposed therebetween and concentric therewith and capable of only limited angular play relative to said driven member, rollers journalled in said cage, said rollers being capable of limited radial movement relative to said cage, to thereby avoid friction with the driven member, a pilot member frictionally engaging said driving member and shiftable by virtue of said frictional engagement into contact with one of said rollers to advance said cage through a sufficient arc relatively to said driven member to carry all said rollers into position to transmit torque from said driving member to said driven member, means secured to said driven member to limit the play of said cage, and means movable radially within said driven member to yieldably hold said pilot member in frictional engagement with said driving member.

11. An overrunning clutch comprising a driving member, a driven member, a roller cage interposed therebetween and concentric therewith and capable of only limited angular play relative to said driven member, rollers journalled in said cage, said rollers being capable of limited radial movement relative to said cage, to thereby avoid friction with the driven member, a pilot member frictionally engaging said driving member and shiftable by virtue of said frictional engagement into contact with one of said rollers to advance said cage through a sufficient arc relatively to said driven member to carry all said rollers into position to transmit torque from said driving member to said driven member, means secured to said driven member to limit the play of said pilot member, said limiting means comprising a stop engageable with said pilot member when the driven member overruns, and means movable radially within said driven member to yieldably hold said pilot member in frictional engagement with said driving member.

FRANCIS LINDER.